A. HANSON & J. R. CHAPMAN.
INSULATED SUPPORT FOR CONTACT RAILS.
No. 11,613. Reissued June 22, 1897.
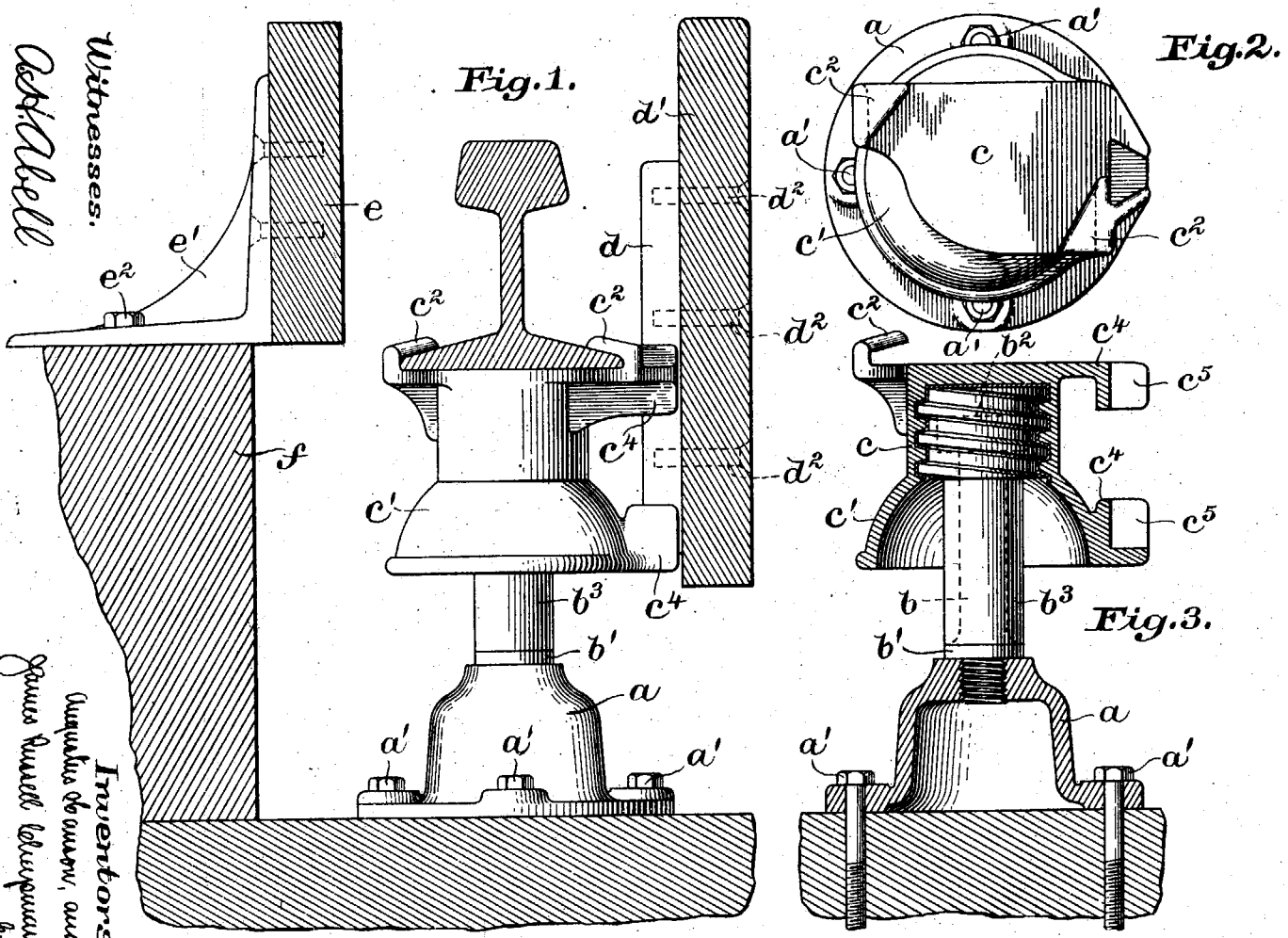
Witnesses.
A. H. Abell
A. F. Macdonald
Inventors.
Augustus Hanson, and
James Russell Chapman,
by
Geo. R. Blodgett,
Atty.
THE NORRIS PETERS CO., WASHINGTON, D. C.

UNITED STATES PATENT OFFICE.

AUGUSTUS HANSON AND JAMES RUSSELL CHAPMAN, OF CHICAGO, ILLINOIS, ASSIGNORS TO THE GENERAL ELECTRIC COMPANY, OF NEW YORK.

INSULATED SUPPORT FOR CONTACT-RAILS.

SPECIFICATION forming part of Reissued Letters Patent No. 11,613, dated June 22, 1897.

Original No. 556,971, dated March 24, 1896. Application for reissue filed October 31, 1896. Serial No. 610,754.

*To all whom it may concern:*

Be it known that we, AUGUSTUS HANSON and JAMES RUSSELL CHAPMAN, citizens of the United States, residing at Chicago, in the county of Cook and State of Illinois, have invented a certain new and useful Improvement in Insulated Supports for Contact-Rails, (Case No. 480,) of which the following is a full, clear, concise, and exact description, reference being had to the accompanying drawings, forming a part of this specification.

Our invention relates to an insulated stand or support for carrying the contact or third rail of an electric railroad, the object of our invention being to provide a support of rigid construction whereby the contact-rail, which is usually heavy and must stand a considerable pressure from the contact device, may be rigidly supported in position, and, furthermore, to provide means for thoroughly insulating the contact-rail.

In embodying our invention a metallic base or standard is provided upon which is mounted a metallic support for the rail, the rail-support being insulated from the standard, whereby the rail is insulated from the portions of the railway structure upon which the standard is mounted. In the preferred form of our invention a pin or bolt provided with a surface of insulating material, such as "ætna," "collophite," or the like, is mounted upon the base or standard, and the rail-support is mounted upon the upper end of the insulated pin. The rail-support is provided at the lower end with a petticoat, which prevents water from dripping upon the insulating-surface from the rail-support. The insulation presenting a hard and smooth surface, the accumulation of moisture and dirt upon its surface (which would lower the surface resistance) is prevented. The insulating pin or bolt is preferably formed with a thread at its lower end whereby it may be screwed into the base or standard, while at the upper end it is provided with a head molded from insulating material, the head carrying screw-threads adapted to engage corresponding threads provided upon the rail-support. After the insulated pin has been secured to the rail-support we preferably pour molten soft metal or sulfur into the joint between the insulated pin and the rail-support to thus securely lock the two together. Upon the face of the rail-support lugs are provided, adapted to engage the flange of the contact-rail and thus maintain the rail against lateral movement. The lugs are preferably cut away at an angle, so that the rail may be placed upon the rail-support with the latter in a slightly-rotated position, after which the support may be rotated to bring the lugs into engagement with the flange, the employment of bolts for securing the rail to the rail-support being thus obviated.

From the foregoing brief description of our invention it will be seen that the main feature of it consists in an insulated rail-support or rail-support insulated from the road structure, yet rotatable so that it may be readily disengaged from the rail if necessary.

On one side of the rail-support a vertical slot or channel is provided, in which a key or wedge may be inserted. Guard-planks are secured to the keys (the upper edges of the guard-planks extending above the top of the rail when the planks are placed in position) by the insertion of the keys or wedges into slots or channels provided therefor in the rotatable support.

The guard-planks may be readily removed at any time by raising them to withdraw the keys from the slots. A slot may be thus provided upon each side of the rail-support for a guard-plank upon each side of the contact-rail, but in elevated structures a guard-beam usually extends along one side of the track, upon which one of the guard-planks may be mounted with brackets. When this construction is employed, it is only necessary to provide means for supporting one of the guard-planks upon the rail-support.

We will describe our invention in particular by reference to the accompanying drawings, in which—

Figure is a view of a rail-support embodying our invention, the rail and the guard-planks being shown in section. Fig. 2 is a plan view of the support. Fig. 3 is a sectional view thereof.

Like letters refer to like parts in the several figures.

The support comprises a base or standard $a$, which may be mounted upon the ties or upon other parts of the structure through the agency of bolts $a'$ $a'$, passing through a flange provided upon the standard. To the upper end of the standard is screwed a metallic pin or bolt $b$, the bolt being provided with a shoulder $b'$, adapted to rest against the upper face of the standard. The pin or bolt $b$ is provided with an enlargement or head $b^2$ at the end. About the bolt $b$ is molded insulating material $b^3$, the molded insulating material taking the form of an enlargement or head at the upper end provided with screw-threads adapted to engage screw-threads provided upon the rail-support $c$. The rail-support carries a petticoat $c'$, which prevents water dripping from the rail-support from falling upon the insulated surface of the bolt or pin $b$. The insulating material presenting a smooth and hard surface, there is little tendency for moisture and dirt to accumulate upon the surface and thus lessen the surface resistance. The upper face of the rail-support $c$ carries lugs $c^2$ $c^2$, the inwardly-projecting ends of which are adapted to engage the flange of the rail and maintain the same in position. As shown more clearly in Fig. 2, the lugs $c^2$ are preferably cut away at an angle, whereby when the support is rotated the flange of the rail may be inserted between the lugs, and then by the rotation of the support the lugs may be caused to engage the upper faces of the flange to lock the rail in position. Upon the side of the rail-support are provided projections $c^4$ $c^4$, in which channels $c^5$ $c^5$ are provided for the reception of a key or wedge $d$, to which a guard-plank $d'$ is secured by means of screws $d^2$ $d^2$. The upper edge of the guard-plank extends above the top of the contact-rail to thus guard against objects coming in contact with the contact-rail. The guard-plank $d'$ may be readily removed when desired by withdrawing the keys or wedges $d$ from the slots $c^5$. A guard-plank $e$ is mounted upon brackets $e'$, which are secured to the guard-beam $f$ by bolts or screws $e^2$.

Modifications may readily be devised by engineers in the structure which we have invented, but we consider any insulated rail-support provided with lugs so arranged that the rail may be gripped or disengaged by rotation of the part of the support in contact with the rail as within our invention.

What we claim as new, and desire to secure by Letters Patent of the United States, is—

1. In an insulated support for contact-rails, the combination with a metallic base or standard, of a metallic pin provided with screw-threads at the lower end adapted to engage a tapped hole in said base or standard and with a shoulder adapted to rest against the top of said standard, said pin being provided with a layer of hard insulating material molded thereon to render said pin insulating, said layer of insulating material being enlarged at the upper end to form a head, threads being formed upon said head, and a metallic rail-support provided upon the under side with a socket for the reception of said threaded head, said socket being provided with screw-threads to receive and engage the threads provided upon the enlarged head of the pin, said rail-support being provided with a petticoat surrounding said socket, substantially as described.

2. In an insulating-support for contact-rails, the combination with a metallic base or standard, of a metallic pin secured at the lower end to said standard and occupying a vertical position, said metallic pin being provided throughout its length with a layer of hard insulating material molded thereon, threads being formed at the upper end, and a metallic rail-support having a threaded socket to receive the threaded end of said insulating-pin, said rail-support carrying a petticoat surrounding said socket, whereby the rail-support is insulated from the base or standard and the hard insulating-surface of the pin prevents surface leakage, substantially as described.

3. In an insulated support for contact-rails, the combination with a base or standard, of a rail-support mounted thereon and insulated therefrom, said rail-support being provided with lugs adapted to engage the flange of the rail, and said lugs being cut away at an angle to permit the placing of the rail in position when the support is angularly rotated, substantially as described.

4. As a new article of manufacture, an insulator for the contact or third rails of an electric railway, comprising a separate support adapted to be secured to the rail by rotation, and a body of insulating material separating the rotating support from the road structure.

5. As a new article of manufacture, a support for the contact or third rails of electric-railway systems, comprising a body of insulating material separating the part of the support in contact with the rail from the road structure, and a separate rotatable gripping device between the rail and the insulation adapted to engage with the rail so that by its rotation it may either grip or release it.

6. As a new article of manufacture, a support for the contact or third rails of electric-railway systems, comprising a body of insulating material separating the part of the support in contact with the rail from the road structure, a rotatable gripping device separate from and supported by the insulation and adapted to engage with the rail so that by its rotation it may either grip or release it, and means for securing the rotatable portion in its gripping position.

7. As a new article of manufacture, an insulating-support for the contact or third rails of electric-railway systems, comprising a body of insulating material separating the part of the support in contact with the rail from the road structure, and a separate rotatable rail-support provided with lugs adapted to engage with the flange of the rail in one position of the rotatable support, and to release the flange when turned to another position.

8. The combination with insulated supports, comprising each a standard or base and a rail-support mounted thereon and insulated therefrom, of guard-planks carrying keys or wedges, and vertical slots provided upon said rail-supports for the reception of said keys or wedges, substantially as described.

9. In an insulated support for contact-rails, the combination with the base or standard *a*, of the insulated bolt or pin *b*, provided with an insulating-surface and a screw-threaded head, and the rail-support *c* carrying the petticoat $c'$, lugs $c^2$, $c^2$ and the vertical slot $c^5$; substantially as described.

In witness whereof we hereunto set our hands this 19th day of October, 1896.

AUGUSTUS HANSON.
JAMES RUSSELL CHAPMAN.

Witnesses:
Z. E. KNAPP,
F. TOPHAM.